(12) United States Patent
Srnec

(10) Patent No.: US 10,278,043 B2
(45) Date of Patent: Apr. 30, 2019

(54) SYSTEMS AND METHODS OF CONTROLLING AN ASSOCIATION BETWEEN WIRELESS DEVICES WHILE IN AN ASSIGNED DOMAIN

(71) Applicant: THERMO KING CORPORATION, Minneapolis, MN (US)

(72) Inventor: Matthew Srnec, Minnetonka, MN (US)

(73) Assignee: THERMO KING CORPORATION, Minneapolis, MN (US)

( * ) Notice: Subject to any disclaimer, the term of this patent is extended or adjusted under 35 U.S.C. 154(b) by 0 days.

(21) Appl. No.: 15/804,627

(22) Filed: Nov. 6, 2017

(65) Prior Publication Data

US 2018/0077519 A1    Mar. 15, 2018

Related U.S. Application Data

(63) Continuation of application No. 14/947,487, filed on Nov. 20, 2015, now abandoned.

(60) Provisional application No. 62/082,300, filed on Nov. 20, 2014.

(51) Int. Cl.
*H04W 4/70* (2018.01)
*G06Q 10/08* (2012.01)
*H04B 5/00* (2006.01)
*H04L 29/08* (2006.01)

(52) U.S. Cl.
CPC .......... *H04W 4/70* (2018.02); *G06Q 10/0833* (2013.01); *H04B 5/0068* (2013.01); *H04L 67/00* (2013.01)

(58) Field of Classification Search
CPC ...... G06K 7/10366; G06K 2017/0045; H04W 4/70

USPC ........................................................ 340/10.1
See application file for complete search history.

(56) References Cited

U.S. PATENT DOCUMENTS

| 7,142,110 | B2 | 11/2006 | Schmidtberg et al. |
| 7,493,211 | B2 | 2/2009 | Breen |
| 7,667,573 | B2 | 2/2010 | Ehrman et al. |
| 2003/0003777 | A1* | 1/2003 | Lesesky .............. B60R 16/0315 439/34 |

(Continued)

FOREIGN PATENT DOCUMENTS

| EP | 1471693 | 10/2004 |
| WO | 2012078081 | 6/2012 |

OTHER PUBLICATIONS

European Search Report for European Application No. 15195624.0 dated Jan. 29, 2016 (6 pages).

(Continued)

*Primary Examiner* — Vernal U Brown
(74) *Attorney, Agent, or Firm* — Hamre, Schumann, Mueller & Larson, P.C.

(57) ABSTRACT

Systems and methods of controlling an association between wireless devices in an assigned domain or bonded area of a transport unit are disclosed. Generally, the embodiments include identifying wireless devices in a bounded area, and establishing an association between the wireless devices. The method may include identifying new wireless device(s) when the transport unit is away from other transport units, and establishing an association with the new wireless device (s). Confirming that the transport unit is away from other transport units may include determining that the transport unit is in a motion state for a predetermined period of time.

19 Claims, 3 Drawing Sheets

(56) References Cited

U.S. PATENT DOCUMENTS

| | | | |
|---|---|---|---|
| 2003/0204407 A1* | 10/2003 | Nabors | G06Q 10/08 |
| | | | 709/202 |
| 2005/0017855 A1 | 1/2005 | Harvey | |
| 2005/0236479 A1 | 10/2005 | Schmidtberg et al. | |
| 2006/0015233 A1* | 1/2006 | Olsen, III | G01V 15/00 |
| | | | 701/50 |
| 2006/0055564 A1* | 3/2006 | Olsen | B60R 25/1004 |
| | | | 340/994 |
| 2013/0147617 A1* | 6/2013 | Boling | G08B 21/18 |
| | | | 340/431 |
| 2013/0265155 A1 | 10/2013 | Wible et al. | |
| 2014/0075514 A1 | 3/2014 | Prasad et al. | |
| 2014/0187219 A1 | 7/2014 | Yang et al. | |

OTHER PUBLICATIONS

Transport Topics, "Cadec Offers TempTracker for PowerVue" available online at http://www.ttnews.com/articles/basetemplate.aspx?storyid=33175&utm_source=tech&utm_medium=newsletter&utm_campaign=newsletter , Oct. 15, 2013.

Cadec, "Solution: Route Tracking" available online at https://web.archive.org/web/20140625141610/http://cadec.com/solutions/CSrouteTracking.php , 2012.

* cited by examiner

SYSTEMS AND METHODS OF CONTROLLING AN ASSOCIATION BETWEEN WIRELESS DEVICES WHILE IN AN ASSIGNED DOMAIN

FIELD

The disclosure herein relates to systems and methods to control a wireless association between two or more wireless devices while within the same assigned domain.

BACKGROUND

A transport unit can be used, for example, to transport a cargo. A transport unit as defined herein generally refers to an apparatus that can be used to move a cargo, such as food, drugs, or other merchandise. The transport unit can be self-propelled, such as a truck, a tractor, a bus, a train, an airplane or a ship. The transport unit can also be moved by a prime mover, such as, for example, a shipping container, a trailer, etc. The transport unit can also refer to a combination of a self-propelled transport unit and a non-self-propelled transport unit.

Wireless devices can be used in a transport unit for various purposes. For example, a wireless cargo temperature sensor can be placed to sense a temperature of a particular cargo within the transport unit and then transmit the cargo temperature information wirelessly to, for example, a data recorder, a controller, etc. A wireless cargo space temperature sensor can be placed in a cargo space of the transport unit to sense a temperature within the transport unit and then transmit the temperature information wirelessly to, for example, a data recorder, a controller, etc. A wireless door sensor can be used to sense, for example, whether a trailer door is open or closed and can transmit the state of the door wirelessly. A wireless fuel sensor can sense a fuel level in a fuel tank and transmit the level of the fuel wirelessly. A wireless display can be placed in a cab of a truck and display information for a driver. It is to be appreciated that the wireless devices listed herein are exemplary. Wireless devices can be configured to serve other functions and purposes.

Wireless devices allow information to be transmitted and/or received wirelessly. The wireless devices can be placed relatively freely in a transport unit without the limitations associated with using wired devices.

SUMMARY

The embodiments as disclosed herein are directed to systems and methods to control a wireless association between two or more wireless devices while in an assigned domain.

The wireless association, generally, can be established when the wireless devices can be confirmed, for example, to be on the same transport unit. The embodiments herein also disclose systems and methods to remove an association between two or more wireless devices when one or more of the wireless devices are removed from the transport unit.

In some embodiments, a method of establishing a wireless association in a transport unit may include: confirming the transport unit is away from other transport units; and establishing a wireless association between wireless devices on the transport unit.

In some embodiments, confirming the transport unit is away from one or more other transport units may include determining whether the transport unit is in motion for at least a predetermined period of time; and confirming the transport unit is away from the one or more other transport units when the transport units is in motion for at least the predetermined period of time.

In some embodiments, confirming the transport unit is away from the one or more other transport units may include determining whether the transport unit travels at least at a predetermined speed for at least a period of time; and confirming the transport unit is away from the one or more other transport units when the transport unit travels at least at the predetermined speed for at least the period of time.

In some embodiments, confirming the transport unit is away from the one or more other transport units may include scanning tags of the wireless devices; and determining whether a new tag is present. In some embodiments, the method may include, when a new tag is present, waiting for a predetermined period of read time before scanning the tags of the wireless device again; and determining whether the new tag is still present to confirm that the transport unit is away from the one or more other transport units. Each of the wireless devices typically includes one tag to uniquely identify the wireless device. However, in some embodiments, each of the wireless devices may include more than one tag.

In some embodiments, the method may further include establishing a wireless association between two or more of the wireless devices on the transport unit, which may include adding the tags of the wireless devices to a tag list; and assigning a data storage location to each of the wireless devices.

In some embodiments, the method may further include determining whether any of the two or more wireless devices are removed from the transport unit; and when any of the two or more wireless devices is removed from the transport unit, removing the association between the removed wireless device and the remaining wireless devices.

In some embodiments, determining whether any of the two or more wireless devices is removed from the transport unit may include: scanning the tags of the wireless devices; determining whether any of the tags is missing by comparing the tags against a tag list; and when at least one of the tags is missing from the tag list at least for a predetermined number of read cycles, confirming a wireless device corresponding to the at least one of the tags has been removed from the transport unit.

In some embodiments, removing the wireless device from the wireless association may include removing any tags associated with the removed wireless device from the tag list; and freeing a storage location assigned to record an association from the removed wireless device.

While the embodiments discussed herein are directed to wireless devices while in a transport unit, it will be appreciated that the embodiments described herein can be also be used for wireless devices while, for example, in a warehouse or other locations where a plurality of wireless devices are entering and/or leaving therefrom.

In some embodiments, power conservation of the wireless devices can be employed. For example, one or more wireless devices can be attached to boxes or specific shipments and an endpoint location (e.g., shipment destination) of a delivery chain can include: a wireless receiver. Based on the wireless association between the one or more wireless devices and the wireless receiver, it can be determined whether the one or more wireless devices has reached the endpoint location wireless receiver. When a disassociation event of the one or more wireless sensors is synced with a previously determined endpoint location, the one or more wireless sensors can be configured, for example, to enter a delivered state that can sleep the reporting radio transmission until, for example, movement of the one or more wireless sensors is detected.

In some embodiments, the system and method described herein can provide an alert for a missed wireless sensor hand-off. For example, within a delivery system network, a wireless device can be designated to a specific shipment designated for delivery based on, for example, a bill of lading, delivery logistics, etc. The embodiments described herein can determine when, for example, within a delivery time window, the wireless device is to be transferred from, for example, one transport unit to another transport unit, one transport unit to a distribution center, one transport unit to a customer site, etc. The embodiments described herein can determine whether the wireless device is transferred during the delivery time window and whether the wireless device is a) still paired with the previous delivery system, b) unpaired from the previous delivery system but not paired to the subsequent delivery system, or c) dropped from the previous delivery system and picked up by an unexpected delivery system. A specific alert can be generated for each of (a)-(c) and can be used to flag theft, missed delivery, late delivery or refused delivery. These embodiments can provide additional resolution, location and environmental data especially when grouped with other devices in a designed system that can be achieved in previous alert-based systems, such as RFID systems.

Other features and aspects of the systems, methods, and control concepts will become apparent by consideration of the following detailed description and accompanying drawings.

BRIEF DESCRIPTION OF THE DRAWINGS

Reference is now made to the drawings in which like reference numbers represent corresponding parts throughout.

DETAILED DESCRIPTION

Figure 1:
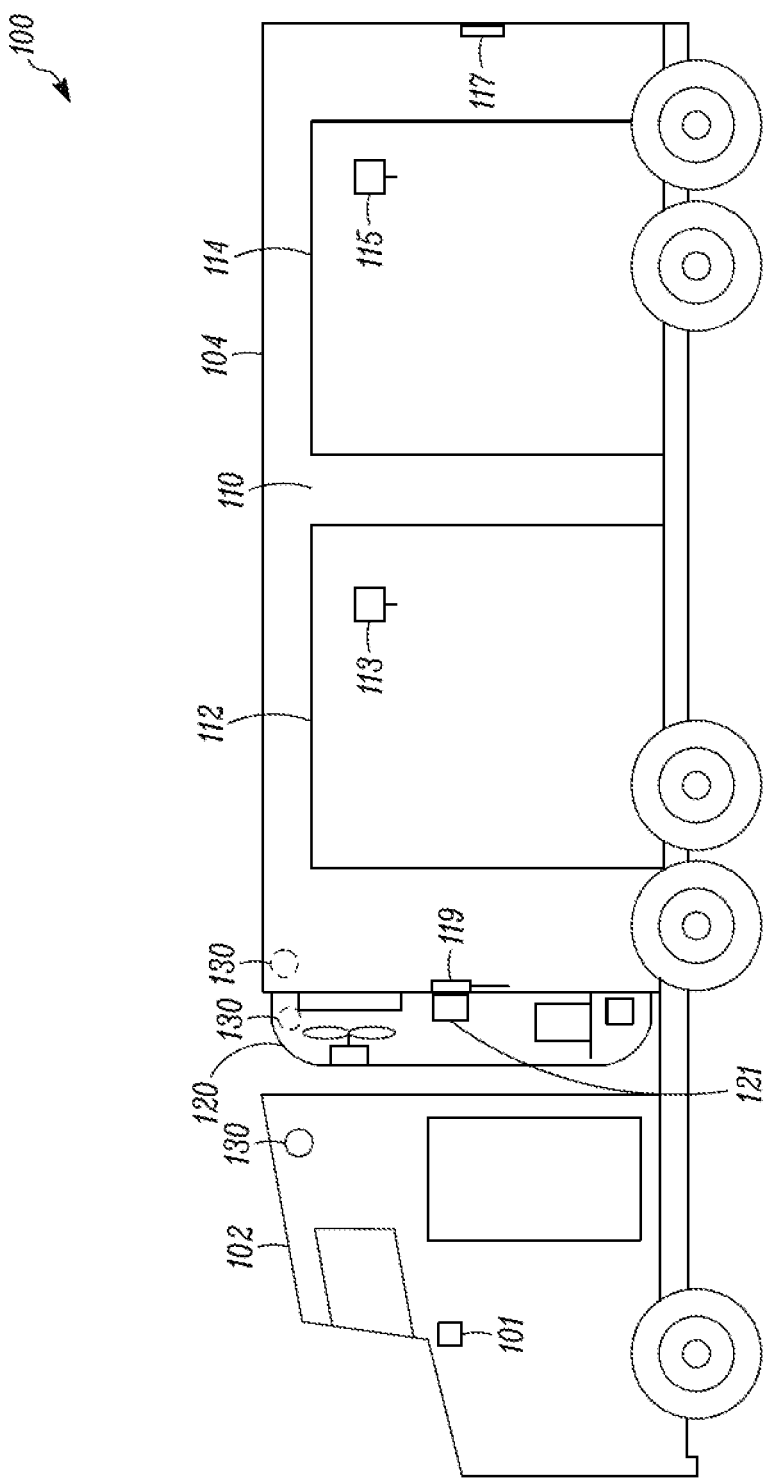
FIG. 1 illustrates a transport unit according to one embodiment of this disclosure.

A wireless device can be used in an assigned domain (e.g., transport unit, warehouse, etc.) for various purposes. For example, a wireless cargo temperature sensor can be used to monitor a temperature of a particular cargo, a wireless cargo space temperature sensor can be used to monitor a temperature within a cargo space of a transport unit, a state (e.g. open or closed) of the cargo door, an ambient temperature, a fuel level, etc., and can transmit the information wirelessly to, for example, a receiver in a cab of a tractor. The information can then be, for example, recorded by a data logging system (e.g. a data logger, a cloud data storage), displayed in a driver's screen, or be used to control other equipment of the transport unit (e.g. a transport refrigeration unit (TRU)). A wireless device as described herein can be configured to pair with another wireless device, and transmit and/or receive information wirelessly with another wireless device. In one example, one or more wireless sensors can be manually paired with a central coordinator.

In some situations, a wireless device may be transitional. For example, during cargo transportation, a wireless device (e.g. a wireless sensor) may be moved into and out of a transport unit during transport and delivery. It may be desirable to establish a transitional association between the wireless device(s) for the cargo space (e.g., a cargo temperature sensor) and other wireless devices on the transport unit. The term "transitional association" refers to an association that is relatively temporary. For example, an association established when a wireless device is on a specific transport unit. The association may be removed when the wireless device is no longer on the specific transport unit.

Such a transitional association allows information about the cargo, which, for example, may be at least partially provided by the transitional wireless device on the cargo, to be sent to a user during the transportation of the cargo via, for example, telematics devices, mobile devices (e.g. a mobile phone), etc. The information can include, for example, an identity of the specific transport unit carrying the cargo, a temperature reading history, a location of the cargo, any third party logistics information (e.g. billing and invoicing, transport history, safety assessment, maintenance alert, and planning software, financial transaction records etc.). Transmitting information about the cargo to a user during transportation may facilitate enterprise level decision making and risk assessment (e.g. high level corporate decision making and risk assessment) during transportation.

In some situations, when the cargo is delivered, it may be desirable to remove the transitional association with the wireless device on the cargo. The transitional association may be established or removed manually, but may not be practical. It may be desirable to establish or remove such an association automatically.

However, establishing or removing a transitional association between wireless devices on the same transport unit can be difficult in some situations. For example, when there are multiple transport units stationed relatively close by, e.g. in a shipping yard, it may be difficult to distinguish multiple wireless devices located on different transport units, making it difficult to establish an association between the wireless devices on the same transport unit.

The embodiments as disclosed herein are directed to systems and methods to control an association (e.g. a transitional association) between two or more wireless devices in an assigned domain or bonded area (e.g. a specific transport unit, a warehouse, etc.) without the need for a manual pairing. More specifically, the embodiments as disclosed herein are directed to systems and methods to control an association between two or more wireless devices carried by the same transport unit.

While the embodiments discussed herein are directed to wireless devices while in a transport unit, it will be appreciated that the embodiments described herein can be also be used for wireless devices while, for example, in a warehouse or other locations where a plurality of wireless devices are entering and/or leaving therefrom.

Generally, the embodiments can include identifying wireless devices in a bounded area, and establishing an association between the wireless devices. In some embodiments, a method may include identifying a new wireless device(s) when the transport unit is away from other transport units, and establishing an association with the new wireless device (s). In some embodiments, confirming that the transport unit is away from other transport units may include determining that the transport unit is in a motion state for a predetermined period of time. In some embodiments, a transport unit location may be compared to a location database of other transport units. When the transport unit is in a location that is away from locations of other transport units in the database, an association can be established.

References are made to the accompanying drawings that form a part hereof, and in which is shown by way of illustration of the embodiments in which the embodiments may be practiced. It is to be understood that the term used herein are for the purpose of describing the figures and embodiments and should not be regarded as limiting the scope.

FIG. 1 illustrates a transport unit 100 including a trailer 104 with a Transport Refrigeration Unit (TRU) 120 hauled by a tractor 102, according to one embodiment. The trailer 104 has a cargo space 110, carrying a first cargo 112 and a second cargo 114. The first cargo 112 can be equipped with a first wireless cargo temperature sensor 113, and the second cargo 114 can be equipped with a second wireless cargo temperature sensor 115. The cargo space 110 also includes a wireless cargo space temperature sensor 119. The trailer 114 also includes a wireless door sensor 117.

In the illustrated embodiment, the TRU 120 can be used to regulate a space temperature in the cargo space 110. The tractor 102 and the TRU 120 are equipped with a first wireless receiver 101 and a second wireless receiver 121. The first and/or second wireless receivers 101, 121 may be configured to establish a wireless association with other wireless devices, e.g. the first and second wireless cargo temperature sensors 113, 115, the wireless cargo space temperature sensor 119, and/or the door sensor 117. The term "establish a wireless association" generally refers to establishing wireless communication (receiving/transmitting) between at least two wireless devices, so that information can be communicated between the wireless devices without a wire. In some embodiments, establishing a wireless association may include at least one of the wireless devices (e.g. a wireless receiver) scanning tags of other wireless devices, establishing a tag list for the wireless devices, and establishing a suitable communication protocol between the wireless devices. The term "tag" generally refers to a piece of information that can be used to uniquely identify a wireless device, which allows, for example, wireless devices having same functions to be identified within a network. Generally, one wireless device may include one tag, with the understanding that the wireless device can have more than one tag in some embodiments. In some embodiments, the tag may be the broadcast MAC address for the wireless device.

In the illustrated embodiment, when the wireless association is established, the first and/or second wireless receivers 101, 121 can receive information transmitted by other wireless devices (e.g. the first and second wireless temperature sensors 113, 115). The first and/or second wireless receivers 101, 121 can also transmit information to the other wireless devices. The wireless communication protocol can include, for example, a ZigBee wireless protocol (e.g. ZigBee RF4CE protocol), a Wi-Fi protocol, a Bluetooth protocol, passive or active radio-frequency identification (RFID), or other suitable wireless communication protocols.

The term "wireless receiver" generally refers to a wireless device that can receive information from another wireless device wirelessly. In some embodiments, the wireless receiver can be included in a communication module of a control system (e.g. a control system of the TRU). In some embodiments, the wireless receiver can be connected to a wireless human machine interface (HMI) device to display information to a driver. In some embodiments, the wireless receiver can be connected to an information recorder (e.g. a data logger) to record information received by the wireless receiver.

In some embodiments, each of the wireless devices may have a unique tag to identify the wireless device associated with the tag. Also, in some embodiments, the tag for each of the wireless devices can be unique to the wireless device. In some embodiments, the tag can be a serial number of the wireless device. In some embodiments, establishing a wireless association may include scanning the tags of nearby wireless devices by, for example, a wireless receiver, and establishing a tag list. In some embodiments, the tag list of the nearby wireless devices may be saved in a memory unit of the wireless receiver. In some embodiments, the tag list saved in the memory unit may be updated or deleted. In some embodiments, the wireless receiver may function as a wireless coordinator in a wireless network.

When two transport units are relatively close by, wireless signal ranges of wireless devices on different transport units may overlap. It can be difficult to distinguish the wireless devices on different transport units in the tag scanning process.

To help ensure that a wireless association between the wireless devices on the same transport unit is established, a method of establishing an association between wireless devices may include establishing a wireless association when the transport unit is out of a wireless signal range of the wireless devices on other transport unit(s). That is, the wireless association may be established when it can be confirmed that the nearby wireless devices are within a boundary of the same transport unit.

The transport unit may be equipped with a device or a system to help determine whether the transport unit is away from other transport units. In the illustrated embodiment, the transport unit 100 may be equipped with a state-sensing device 130 that is configured to obtain information to help determine whether the transport unit 100 is away from other transport units.

Various types of information may be used to help determine whether the transport unit 100 is away from other transport units. Such information may include, for example, a motion of the transport unit 100, a duration of the transport unit 100 in motion, a speed of the transport unit 100, a location of the transport unit 100, a signal strength of wireless devices, and/or a location of an adjacent transport unit in a database (e.g. a cloud database).

In some embodiments, the state-sensing device 130 may include a motion sensing device (e.g. an accelerometer or a vibration detector) to help determine whether the transport unit 100 is in motion. In some embodiments, the state-sensing device 130 may include a geographic location receiver (e.g., a GPS receiver, a GLONASS receiver, a cellular triangulation receiver, etc.) to help determine a location and/or a speed of the transport unit 100. In some embodiments, the state-sensing device 130 may include a signal strength sensing device to determine a signal strength of a wireless device. In some embodiments, the state-sensing device 130 may include a telematics device (e.g. a wireless cellular module) that is capable of communicating with, for example, a central office through, for example, a cellular network, so that the state (e.g. the speed, the location) of the transport unit 100 may be transmitted to a database (e.g. a cloud based storage) of the central office. Location information of other transport units may be transmitted to and received by the state-sensing device 130. In some embodiments, the state-sensing device 130 may include a timer that can count a period of time that the transport unit 100 stays in a specific state (e.g. in motion, at a location, etc.). It is to be appreciated that the transport unit 100 can also include a one or more of a motion sensing device, a geographic location receiver, a telematics device, a timer, etc.

The state-sensing device 130 may include a data processing unit (e.g. a CPU) and a memory to help process and store the information obtained. The state-sensing device 130 may also transmit the information obtained to a data process unit of other components of the transport unit 100, such as for example, a controller of the TRU 120, a mobile device (e.g. a cell phone or laptop, etc.).

While the state-sensing device 130 shown in FIG. 1 is positioned on the tractor 102, it is appreciated that in other embodiments, the state-sensing device 130 may be optionally positioned on the transport unit 100, for example, on or in the trailer 104, and/or the TRU 120.

In practice, the state of the transport unit 100 can be used to determine whether a wireless association between wireless devices on the same transport units can be established. In some embodiments, when the transport unit 100 is determined to be away from other transport units, the wireless association can be established.

In some embodiments, whether the transport unit 100 is in motion may be determined. When the transport unit 100 is in motion, the wireless association between wireless devices may be established. In some embodiments, a time period of the transport unit 100 being in motion can be determined. When the time period of the transport unit 100 being in motion reaches or exceeds a predetermined period of time, the wireless association may be established.

In some embodiments, the speed of the transport unit 100 may be determined. When the transport unit 100 travels at or above a predetermined speed, the wireless association between wireless devices may be established. In some embodiments, a time period of the transport unit 100 being in the predetermined speed can be determined. When the time period of the transport unit 100 being in the predetermined speed reaches or exceeds a predetermined period of time, the wireless association may be established.

In some embodiments, the location of the transport unit 100 may be determined. The location of the transport unit 100 may be checked against a location database that may include the location information of any nearby transport units, warehouses, truck yards, shipping yards, or parking lots, and/or other places where the transport units may be parked. The location database can help determine whether any transport units are (or potentially are) close by. When the location of the transport unit 100 is away from any of the locations in the location database, the wireless association may be established.

In some embodiments, the wireless signal strength of the wireless devices can be determined. When, for example, the transport unit is in motion and the wireless signal strength of a wireless device does not change significantly, a wireless association between the wireless devices may be established.

In some embodiments, when the wireless association between the wireless devices is established, a state of the associated wireless devices may be continuously monitored. The state of the associated wireless devices can be monitored, for example, by the first and/or second wireless receiver 101, 121. Monitoring the state of the associated wireless devices can help determine whether one or more of the associated wireless devices may be moved away from the transport unit 100, and/or whether any new wireless devices may need to be added to an existing association. For example, during transportation, the first and/or second wireless temperature sensors 113, 115 can establish a transitional wireless association with the first and/or second receiver 101, 121, so that the temperature readings can be received by the first and/or second receiver 101, 121. When the first and/or second cargo 112, 114 are delivered to a customer, the first and temperature sensors 113, 115 may be removed from the wireless association. The temperature reading history record that may be saved in the first and/or second receiver 101, 121, can be, for example, downloaded wirelessly by the customer or through a data storage device (e.g. a USB drive).

It is to be appreciated that the embodiment as illustrated in FIG. 1 is exemplary, and configurations/selection of the wireless devices (e.g. the wireless temperature sensors, the wireless door sensor, the wireless receiver, the fuel sensors, the humidity sensors, the current and/or voltage sensors, the tilt sensors, etc.) can be varied.

Figure 2:
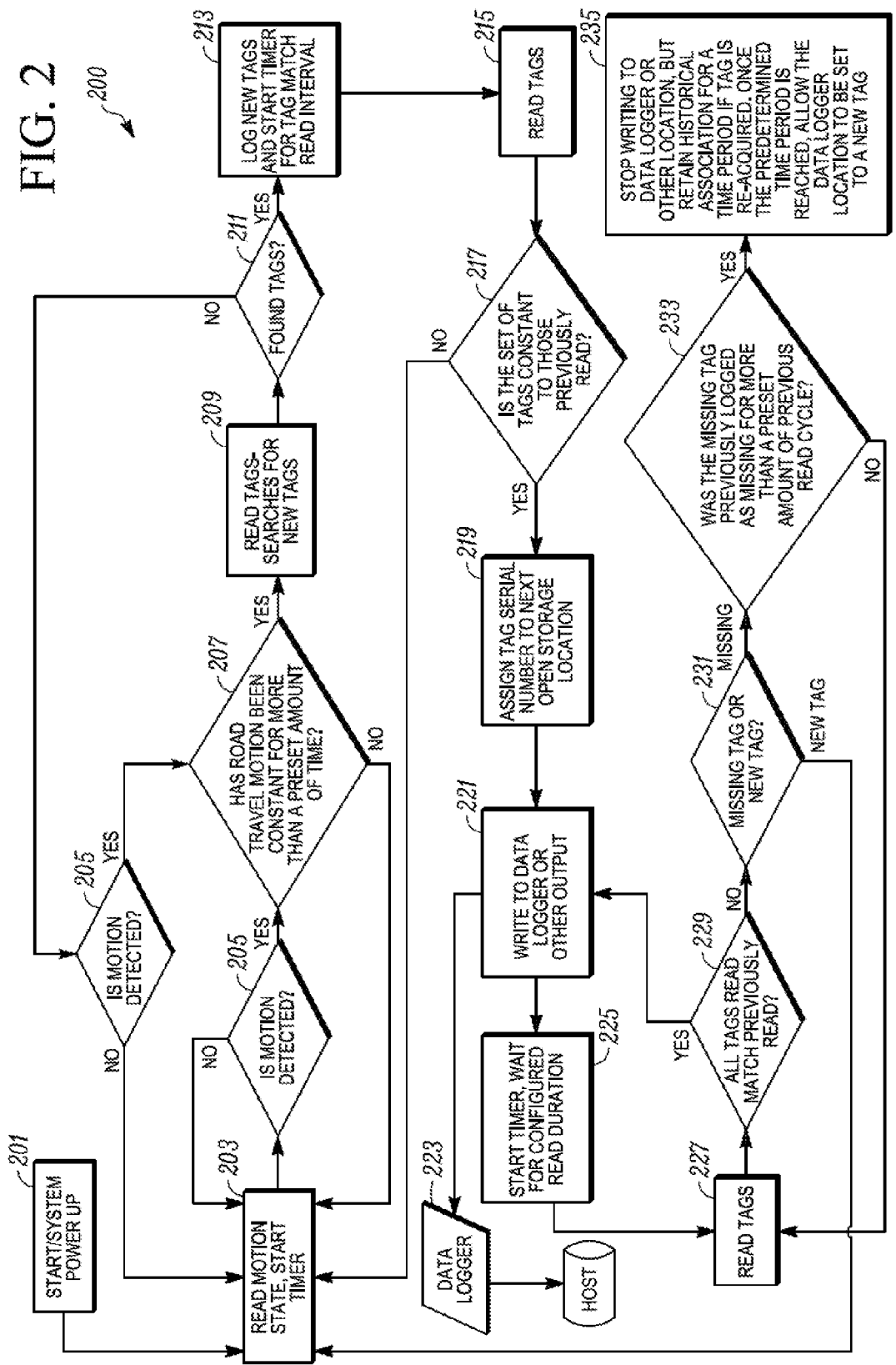
FIG. 2 illustrates a method of establishing an association between wireless devices on a transport unit.

FIG. 2 illustrates a method 200 that can be used in a transport unit (e.g., the transport unit 100 as illustrated in FIG. 1) to control a wireless association between wireless devices. It is to be appreciated that in some embodiments, an existing wireless association may already have been established. The method 200 can be used to add any new wireless devices to, or remove any removed wireless devices from, the existing wireless association. In some embodiments, the method 200 can be used to initiate a wireless association between wireless devices. The wireless association established according to this embodiment can be a wireless association between wireless devices on the same transport unit. In some embodiments, at least a portion of the method 200 can be performed locally, for example, via a controller provided in the transport unit (e.g., the TRU 120). In some embodiments, at least a portion of the method 200 can be performed externally (e.g., via a cloud server, via an external device, etc.).

At 201, a system starts or powers up. The system may include one or more wireless devices and one or more state-sensing devices. The state-sensing device may include a motion-sensing device. The transport unit may also include a timer. It is understood that the system may also include one or more memory units, one or more data processors, e.g. one or more computers, to process data received, and one or more communication devices. The system may also include one or more data storage units (e.g. a data logger) and/or one or more input/output devices (e.g. a monitor, a USB port, etc.).

At 203, the state-sensing device provides a state (e.g. stationary or in motion) of the transport unit and the timer starts to count a period of time that the transport unit stays in the state. At 205, the state of the transport unit can be determined. When the state of the transport unit is stationary ("no" from 205), the method 200 goes back to 203 to continue checking the state of the transport unit.

When the state of the transport unit is in motion ("yes" from 205), the method goes to 207 to determine whether the transport unit remains in motion for more than (or at least the same as) a preset amount of time. The period of time counted by the timer is compared to the preset amount of time. When the transport unit is not in motion for more than the preset amount of time ("no" from 207), the method 200 goes back to 203. When the transport unit remains in motion for more than (or at least the same as) the preset amount of time ("yes" from 207), the method 200 proceeds to 209

At 209, at least one of the wireless devices, e.g. a wireless coordinator or organizer, may perform a scanning process to find tags of the wireless devices, and record the tag(s) of each of the wireless devices. At 211, the tags found in the scanning process may be compared to a previously established tag list for an existing wireless association to determine whether any new tags may be found. The presence of one or more new tags indicates that one or more new wireless devices corresponding to the one or more new tags are present in the same transport unit. This can happen when, for example, a cargo with a wireless device is being transported by the transport unit.

When there are one or more new tags present ("yes" from 211), the one or more new tags can be logged to update the tag list at 213, the method 200 may go to a confirmation process at 215 and 217. A timer may be started to count toward a predetermined read interval. When the timer reaches or exceeds the predetermined read interval, the tags of the wireless devices can be scanned again at 215, and the tags found are compared to the updated tag list at 217.

When there are no new tags present ("no" from 211), the method 200 goes back to 205 to keep detecting whether the transport unit is in motion.

At 217, when the tags found at 215 is constant with the updated tag list ("yes" from 217), it indicates that the new wireless devices corresponding to the one or more new tags found at 211 are on the same transport unit, because the wireless devices appear to move along with the transport unit. The one or more new tags (e.g. serial numbers) can then be assigned to a storage location of a storage device (e.g. a data logger) at 219. The wireless association with the new wireless devices is then established. When the tags found 215 are not constant with the updated tag list ("no" from 217), it may indicate that the one or more new tags found at 211 may not be on the same transport unit. The method 200 goes back to 203.

At 221, information provided by the wireless devices (e.g. a temperature sensor) is recorded by the storage device or the information can be outputted to other suitable devices.

At 223, the information recorded by the storage device may be uploaded to a host (e.g. a cloud based storage system). The uploading can be performed wirelessly or through a downloading device (e.g. a USB drive).

Figure 3:
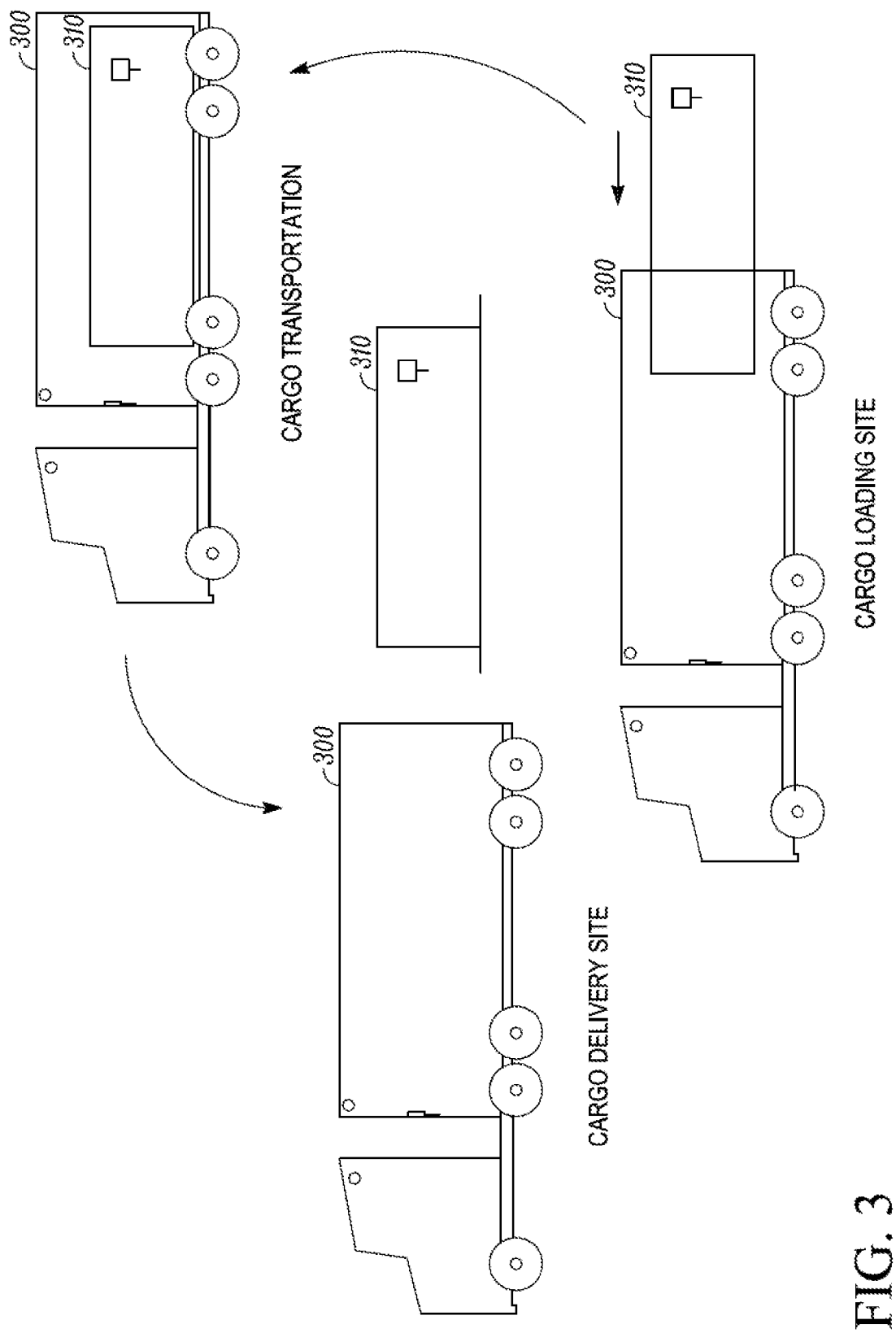
FIG. 3 illustrates a process in which a cargo is loaded to a truck, transported by the truck and delivered to a delivery site.

In practice, the transport unit may receive a cargo and may drop off a cargo at a delivery site. (See e.g. FIG. 3, where a cargo 310 is loaded to a truck 300 at a cargo loading site, transported by the truck 300 and delivered at a delivery site.) A transitional association with one or more wireless devices on the cargo can be established, for example, based on the process from 201 to 223 of the method 200. When, for example, the cargo is delivered to a customer, there is no need to maintain the association with the wireless device(s) on the cargo. The process from 225 to 235 of the method 200 may allow one or more wireless devices on the delivered cargo to be removed from the wireless association. There may be other situations when a wireless device may need to be removed from the existing wireless association. Removing a wireless device from an existing wireless association generally may include: identifying a missing wireless device and removing the corresponding tag from the tag list.

In some embodiments, if the cargo is removed from the wireless association (e.g. removed from the truck) before the intended delivery site, which may indicate that the cargo may be stolen, an alarm may be provided to the driver and/or central coordinator.

At 225, the timer can start to count toward a predetermined read duration. At 227, when the timer reaches or exceeds the predetermined read duration, the tags of the wireless devices are scanned. At 229, the tags found at 227 are compared to the previous tag list (e.g. the updated tag list from 215). When the tags from 227 match the previous tag list ("yes" from 229), which indicates that the tag list for the wireless association are still current and no wireless device is missing, the method 200 goes back to 221. When the tags from 227 do not match the previous tag list, a controller can determine that the tag list may not be current. This may be due to one or more wireless devices coming into the signal range of the transport unit ("new tag" from 231); or one or more wireless devices moving out of the signal range of the transport unit, for example, when the cargo has been delivered ("missing" from 231). At 231, when the tag is new, the method 200 goes back to 203, so that a controller can determine whether the corresponding wireless device is on the same transport unit and a proper wireless association can be established.

At 231, when the tag is missing, the method 200 goes to 233. At 233, the missing tag is logged as missing, and a controller determines whether the missing tag is logged as missing for more than (or at least equal to) a predetermined number of read cycles. When the missing tag is logged as missing for more than (or at least equal to) the predetermined number of read cycles ("yes" from 233), (e.g., indicating that the wireless device corresponding to the missing tags may have been moved out of the transport unit), the method 200 goes to 235. At 235, the recording of information from the wireless device (e.g. to a data logger or other locations) is stopped and the missing tag is removed from the tag list. In some embodiments, the previously recorded information may be stored in a memory for a predetermined time period as a historical record. When the predetermined time period is reached or exceeded, the historical data may be deleted from the memory, or the corresponding data locations may be allowed to receive new information. When the missing tag has not been logged as missing for more than the predetermined number of read cycles ("no" from 233), the method 200 goes back to 227.

In the embodiment illustrated in FIG. 1, for example, when the first cargo 112 and the second cargo 114 are loaded to the trailer 104, a scan of the tags of the first wireless temperature sensor 113 and the second wireless sensor 115 may be performed when the transport unit 100 is in motion for a predetermined time (e.g. 203, 205, 207, 209, 211, 213, 215 and 217 of the method 200), so that the first wireless temperature sensor 113 and the second wireless temperature sensor 115 may be confirmed to be on the transport unit 100. An association can then be established between the first and second wireless temperature sensors 113, 115 and the first and/or second receivers 101, 121 (e.g. 219 of the method 200). The temperature information provided by the first and second wireless temperature sensors 113, 115 may be received by the first and/or second receivers 101. The temperature information can also be recorded in a data logger (e.g. 223 of the method 200). In some embodiments, the temperature information can be recorded to the data logger along with the tag, time stamps of the temperature information, so that a history of the temperature can be recorded. The temperature history information can be downloaded by a customer, for example.

The transport unit 100 may be equipped with a telematics device, so that the temperature information of the first and second cargo 112, 114 may be transmitted to a customer(s) of the first and second cargo 112, 114 during the transportation of the first and second cargo 112, 114. In some embodiments, when the temperature of the cargo is above a threshold, a customer and/or the driver may be alerted in real time? In some embodiments, the customer may also receive geographic location information (e.g. GPS/GLONASS/Cellular Triangulation location information) of the cargo 112, 114, so that the customer can trace the locations of the cargo 112, 114.

The first and second cargo 112, 114 may be delivered to different customers. When, for example, the second cargo 114 is delivered to the customer, a tag scan may result in a missing tag for the second wireless temperature sensor 115 (e.g. 227, 229, and 231 of the method 200). When it is confirmed that the second wireless temperature sensor 115 is no longer with the transport unit (e.g. 233 of the method 200), the association with the second wireless temperature sensor 115 may be removed (e.g. 235 of method 200).

ASPECTS

It is appreciated that any of aspects 1-8 and 9-16 can be combined.

Aspect 1. A method of establishing a wireless association in an assigned domain, comprising:
confirming the assigned domain is away from other assigned domains; and
establishing a wireless association between wireless devices in the assigned domain.

Aspect 2. The method of aspect 1, wherein confirming the assigned domain is away from the other assigned domains includes:
determining whether the assigned domain is in motion for at least a predetermined period of time; and
confirming the assigned domain is away from the other assigned domains when the assigned domain in in motion for at least a predetermined period of time.

Aspect 3. The method of any one of aspects 1 or 2, wherein confirming the assigned domain is away from the other assigned domains includes:
determining whether the assigned domain travels at least at a predetermined speed for at least a period of time; and
confirming the assigned domain is away from the other assigned domains when the assigned domain travels at least at a predetermined speed for at least a period of time.

Aspect 4. The method of any one of aspects 1 to 3, wherein confirming the assigned domain is away from the other assigned domains includes:
scanning tags of the wireless devices;
determining whether a new tag is present; and
when a new tag is present,
waiting for a predetermined period of read time;
scanning the tags of the wireless device again;
determining whether the new tag is still present to confirm that the assigned domain is away from the other assigned domains.

Aspect 5. The method of any one of aspects 1 to 4, wherein establishing a wireless association between wireless devices on the assigned domain includes:
adding the tags of the wireless devices to a tag list; and
assigning a data storage location to each of the wireless devices.

Aspect 6. The method of any one of aspects 1 to 5, further comprising:
determining whether any of the wireless devices is removed from the assigned domain; and
when any of the wireless device is removed from the assigned domain, removing the wireless device from the wireless association.

Aspect 7. The method of aspect 6, wherein determining whether any of the wireless devices is removed from the assigned domain includes:
scanning the tags of the wireless devices;
determining whether any of the tags is missing by comparing the tags against a tag list;
when at least one of the tags is missing from the tag list and the one of the tags has been missing from the tag list at least for a predetermined number of read cycles, confirming a wireless corresponding to the at least one of the tags has been removed from the assigned domain.

Aspect 8. The method of aspect 6, wherein removing the wireless device form the wireless association includes:
removing the tag from the tag list; and
freeing a storage unit assigned to record from the wireless device.

Aspect 9. A wireless association system for establishing a wireless association in an assigned domain, comprising:
a plurality of wireless devices provided within the assigned domain;
a coordinator configured to confirm that the assigned domain is away from other assigned domains and configured to establish a wireless association between the plurality of wireless devices in the assigned domain.

Aspect 10. The wireless association system of aspect 9, wherein the coordinator is configured to confirm the assigned domain is away from the other assigned domains includes:
the coordinator configured to determine whether the assigned domain is in motion for at least a predetermined period of time; and
the coordinator configured to confirm the assigned domain is away from the other assigned domains when the assigned domain in in motion for at least a predetermined period of time.

Aspect 11. The wireless association system of any one of aspects 9 or 10, wherein the coordinator is configured to confirm the assigned domain is away from the other assigned domains includes:
the coordinator configured to determine whether the assigned domain travels at least at a predetermined speed for at least a period of time; and
the coordinator configured to confirm the assigned domain is away from the other assigned domains when the assigned domain travels at least at a predetermined speed for at least a period of time.

Aspect 12. The wireless association system of any one of aspects 9 to 11, wherein the coordinator configured to confirm the assigned domain is away from the other assigned domains includes:
the coordinator configured to scan tags of the wireless devices;
the coordinator configured to determine whether a new tag is present; and
when a new tag is present,
the coordinator configured to wait for a predetermined period of read time;
the coordinator configured to scan the tags of the wireless device again;
the coordinator configured to determine whether the new tag is still present to confirm that the assigned domain is away from the other assigned domains.

Aspect 13. The wireless association system of any one of aspects 9 to 12, wherein the coordinator configured to establish a wireless association between wireless devices on the assigned domain includes:
the coordinator configured to add the tags of the wireless devices to a tag list; and
the coordinator configured to assign a data storage location to each of the wireless devices.

Aspect 14. The wireless association system of any one of aspects 9 to 13, wherein the coordinator is configured to:
determine whether any of the wireless devices is removed from the assigned domain; and
when any of the wireless devices is removed from the assigned domain, the coordinator is configured to remove the wireless device from the wireless association.

Aspect 15. The wireless association system of aspect 14, wherein the coordinator configured to determine whether any of the wireless devices is removed from the assigned domain includes:
the coordinator configured to scan the tags of the wireless devices;
the coordinator configured to determine whether any of the tags is missing by comparing the tags against a tag list;
when at least one of the tags is missing from the tag list and the one of the tags has been missing from the tag list at least for a predetermined number of read cycles, the coordinator is configured to confirm a wireless corresponding to the at least one of the tags has been removed from the assigned domain.

Aspect 16. The wireless association system of aspect 14, wherein the coordinator configured to remove the wireless device form the wireless association includes:
the coordinator configured to remove the tag from the tag list; and
the coordinator configured to free a storage unit assigned to record from the wireless device.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

The invention claimed is:

1. A method of establishing a transitional wireless association in a transport unit, the method comprising:
determining, by a state-sensing device, whether the transport unit is away from a second transport unit; and
when the transport unit is determined to be away from the second transport unit, establishing, by a wireless receiver, a transitional wireless association with a wireless device in the transport unit,
wherein establishing the transitional wireless association includes establishing a communication between the wireless receiver and the wireless device using a unique identification information of the wireless device, and the wireless receiver receiving the unique identification information from the wireless device, and
wherein the transport unit defines an area in which the wireless receiver can maintain the transitional wireless association with the wireless device.

2. The method of claim 1, wherein the state-sensing device includes at least one of a motion sensing device, a geographic location receiver, a signal strength sensing device, a telematics device, and a timer.

3. The method of claim 1, wherein determining whether the transport unit is away from the second transport unit includes:
determining, by the state-sensing device, whether the transport unit travels at least at a predetermined speed for at least a period of time; and
determining, by the state-sensing device, the transport unit is away from the second transport unit when the transport unit travels at least at the predetermined speed for at least the period of time.

4. The method of claim 1, further comprising:
after the transport unit is determined to be away from the second transport unit, scanning, by the wireless receiver, a tag of the wireless device, the tag being the unique identification of the wireless device;
determining, by the wireless receiver, whether a new tag is present; and
when a new tag is present,
waiting, by the state-sensing device, for a predetermined period of read time;
after the predetermined period of read time, scanning, by the wireless receiver, the tag of the wireless device again;
determining, by the wireless receiver, whether the new tag is still present to determine whether the wireless device moves along with the transport unit.

5. The method of claim 1, wherein establishing a transitional wireless association with the wireless device on the transport unit includes:
adding, by the wireless receiver, a tag of the wireless device to a tag list, the tag being the unique identification of the wireless device; and
assigning, by the wireless receiver, a data storage location to the wireless device.

6. The method of claim 1, wherein determining whether the transport unit is away from the second transport unit includes:
determining, by the state-sensing device, whether the transport unit is in motion for at least a predetermined period of time; and
determining, by the state-sensing device, the transport unit is away from the second transport unit when the transport unit is in motion for at least the predetermined period of time.

7. The method of claim 6, wherein determining whether the transport unit is away from the second transport unit includes:
after the motion of the transport unit is detected, starting a timer by the state-sensing device; and
monitoring the timer, by the state-sensing device, until the predetermined period of time is reached.

8. The method of claim 1, further comprising:
determining, by the wireless receiver, whether the wireless device is removed from the transport unit; and
when the wireless device is removed from the transport unit, removing, by the wireless receiver, the wireless device from the transitional wireless association.

9. The method of claim 8, wherein determining whether the wireless device is removed from the transport unit includes:
scanning, by the wireless receiver, a tag of the wireless device, the tag being the unique identification of the wireless device;
determining, by the wireless receiver, whether the tag is missing by comparing the tag against a tag list;
when the tag is missing from the tag list and the tag has been missing from the tag list at least for a predetermined number of read cycles, determining a wireless device corresponding to the tag has been removed from the transport unit.

10. The method of claim 8, wherein removing the wireless device from the transitional wireless association includes:
removing, by the wireless receiver, a tag from the tag list, the tag being the unique identification of the wireless device; and
freeing, by the wireless receiver, a storage unit assigned to record from the wireless device.

11. A transitional wireless association system for establishing a transitional wireless association in a transport unit, comprising:
a plurality of wireless devices provided within the transport unit; and
a coordinator configured to determine whether the transport unit is away from a second transport unit,
when the coordinator determines that the transport unit is away from the second transport unit, the coordinator is configured to establish a transitional wireless association between the coordinator and a wireless device of the plurality of wireless devices in the transport unit,
wherein the coordinator is configured to establish a communication between the coordinator and the wireless device, the wireless device includes a unique identification information that uniquely identifies the wireless device, and the coordinator is configured to receive the unique identification information from the wireless device, and
wherein the transport unit defines an area in which the coordinator can maintain the transitional wireless association with the wireless device.

12. The transitional wireless association system of claim 11, wherein the coordinator is configured to determine whether the transport unit is in motion for at least a predetermined period of time, and
the coordinator is configured to determine the transport unit is away from the second transport unit when the transport unit is in motion for at least the predetermined period of time.

13. The transitional wireless association system of claim 11, wherein the coordinator is configured to determine whether the transport unit travels at least at a predetermined speed for at least a period of time, and
the coordinator is configured to determine the transport unit is away from the second transport unit when the transport unit travels at least at the predetermined speed for at least the period of time.

14. The transitional wireless association system of claim 11, wherein after the transport unit is determined to be away from the second transport unit, the coordinator scans a tag of the wireless device, the tag being the unique identification of the wireless device,
wherein when the coordinator determines that a new tag is present, the coordinator waits for a predetermined period of read time, after the predetermined period of read time, the coordinator scans the tag of the wireless device again and determines whether the new tag is still present to determine whether the wireless device moves along with the transport unit.

15. The transitional wireless association system of claim 11, wherein the coordinator is configured to add a tag of each of the plurality of wireless devices to a tag list, the tag being the unique identification of the wireless device, and
the coordinator is configured to assign a data storage location to each of the plurality of wireless devices.

16. The transitional wireless association system of claim 11, wherein the coordinator is configured to determine whether any of the plurality of wireless devices is removed from the transport unit, and
when any of the plurality of wireless devices is removed from the transport unit, the coordinator is configured to remove the wireless device from the transitional wireless association.

17. The transitional wireless association system of claim 16, wherein the coordinator is configured to scan tags of each of the plurality of wireless devices, each of the tags is the unique identification of each of the wireless device, respectively,
the coordinator is configured to determine whether any of the tags is missing by comparing the tags against a tag list,
when at least one of the tags is missing from the tag list and the one of the tags has been missing from the tag list at least for a predetermined number of read cycles, the coordinator is configured to determine a wireless device corresponding to the at least one of the tags has been removed from the transport unit.

18. The transitional wireless association system of claim 16, wherein the coordinator is configured to remove a tag from a tag list, the tag being the unique identification of the wireless device, and
the coordinator is configured to free a storage unit assigned to record from the wireless device.

19. A transport unit comprising:
a cargo space;
a plurality of wireless devices provided within the cargo space; and
a coordinator configured to determine whether the transport unit is away from a second transport unit,
when the coordinator determines that the transport unit is away from the second transport unit, the coordinator is configured to establish a transitional wireless association between the coordinator and a wireless device of the plurality of wireless devices in the cargo space,
wherein the coordinator is configured to establish a communication between the coordinator and the wireless device, the wireless device includes a unique identification information that uniquely identifies the wireless device, and the coordinator is configured to receive the unique identification information from the wireless device, and
wherein the transport unit defines an area in which the coordinator can maintain the transitional wireless association with the wireless device.

* * * * *